H. O. PETERSON.
FISH EXCLUDER.
APPLICATION FILED OCT. 15, 1917.
1,265,508.
Patented May 7, 1918.
2 SHEETS—SHEET 1.
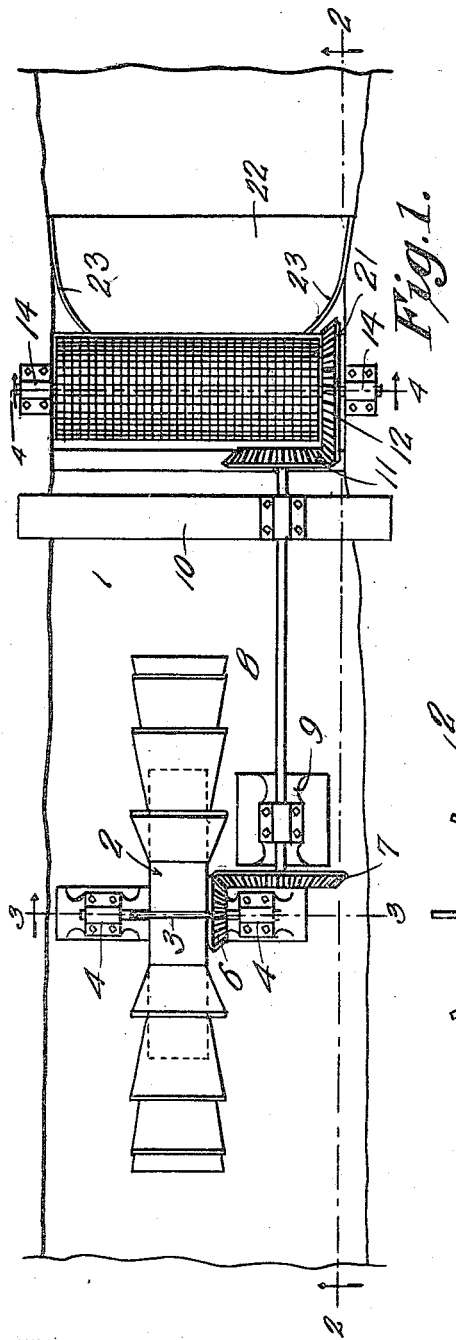
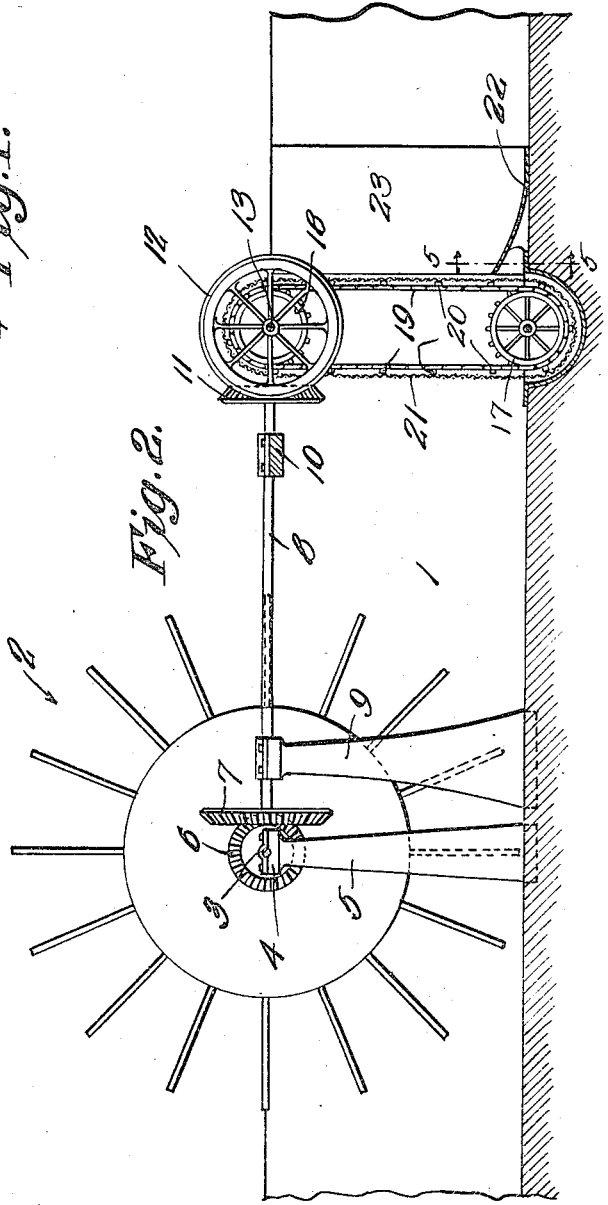
WITNESSES
INVENTOR
Henry O. Peterson,
By Richard Owen,
ATTORNEY

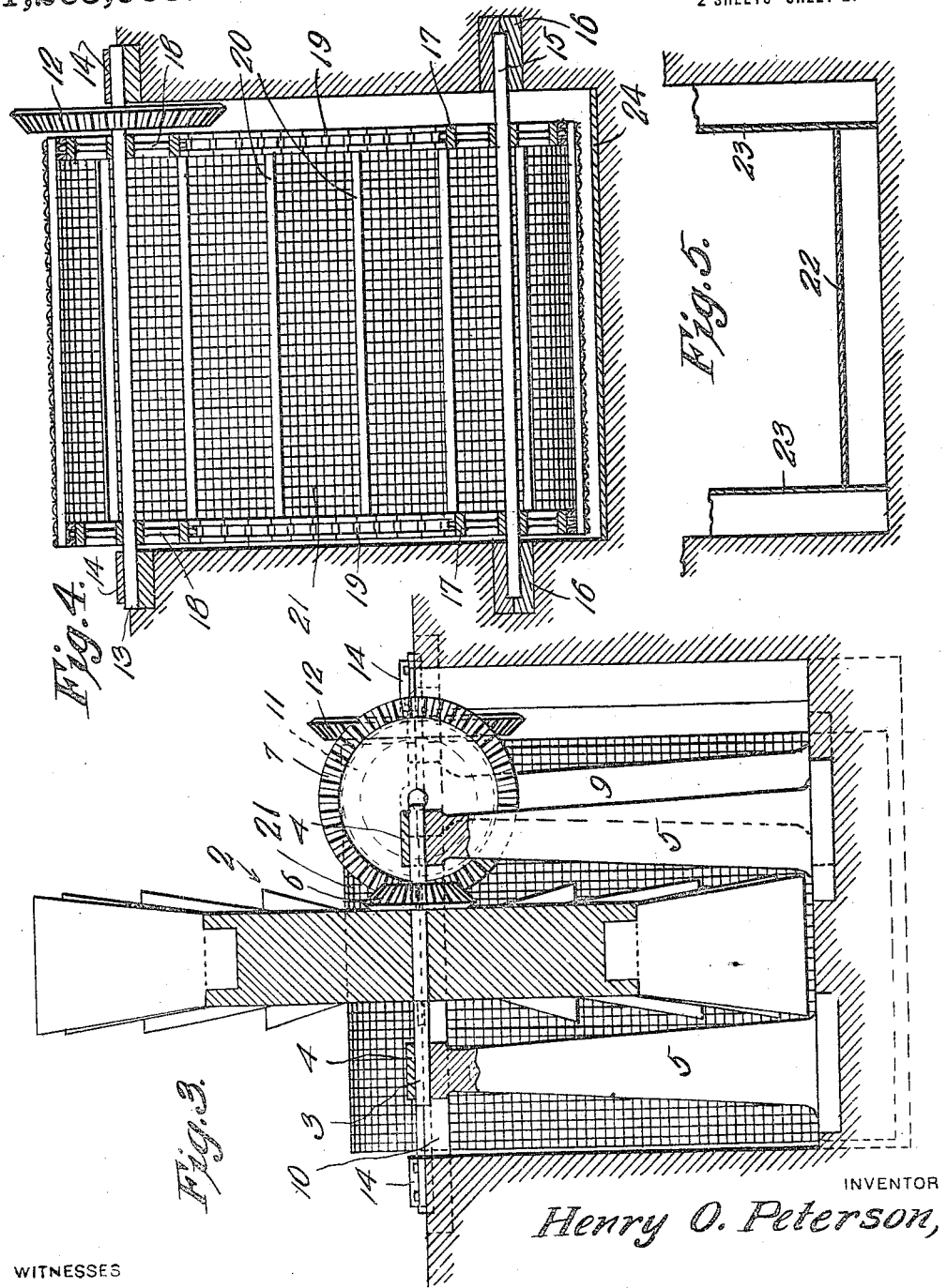

UNITED STATES PATENT OFFICE.

HENRY O. PETERSON, OF CLEAR LAKE, MINNESOTA.

FISH-EXCLUDER.

1,265,508.  Specification of Letters Patent.  Patented May 7, 1918.

Application filed October 15, 1917. Serial No. 196,680.

*To all whom it may concern:*

Be it known that I, HENRY O. PETERSON, a citizen of the United States, residing at Clear Lake, in the county of Sherburne and State of Minnesota, have invented certain new and useful Improvements in Fish-Excluders, of which the following is a specification.

This invention relates to fish excluders of the type used in irrigation ditches or other artificial waterways.

The object of the invention is to provide a simply constructed and efficient apparatus of this class which may be installed in a ditch or flume for preventing fish from head waters from entering the ditch where they would eventually meet sure destruction.

Another object is to so construct a screen or excluder of this character as to increase the general efficiency thereof and insure the exclusion of all fish of no matter what size.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of an excluder constructed in accordance with this invention, Fig. 2 is a vertical section taken on the line 2—2 of Fig. 1, Fig. 3 is a transverse section taken on the line 3—3 of Fig. 1, Fig. 4 is a similar view taken on the line 4—4 of Fig. 1, and Fig. 5 is a detail sectional view taken on the line 5—5 of Fig. 2.

In the embodiment illustrated, an irrigating ditch or sluiceway 1 is shown in which is mounted a water wheel 2 on a shaft 3 revolubly journaled in bearings 4 carried by the upper ends of uprights 5 as is shown clearly in Figs. 2 and 3. This water wheel may be of any suitable or desired construction, and is arranged in rear of the excluder which it is designed to operate.

A bevel gear 6 is fixed to the shaft 3 of the water wheel and meshes with a coöperating bevel gear 7 carried by a shaft 8 disposed longitudinally of the ditch and mounted in suitable bearings on an upright 9 and a cross bar 10, respectively. The cross bar 10 as shown clearly in Fig. 1 is arranged transversely across the top of the ditch. A bevel gear 11 is carried by the front end of shaft 8 and meshes with a coöperating gear 12 carried by a shaft 13 arranged transversely of the ditch and mounted in suitable bearings 14 supported by the side walls of the ditch at the top thereof as is shown clearly in Fig. 4. A similar shaft 15 is mounted in bearings 16 near the bottom of the ditch and in vertical alinement with the bearings 14. Sprocket wheels 17 are carried by the lower shaft 15 and similar sprockets 18 are carried by the upper shaft 13. Sprocket chains 19 pass over these sprocket wheels 17 and 18 and are designed to be operated by said wheels. Rods 20 connect the chains 19 at intervals throughout their length as is shown clearly in Fig. 4 and operate as bracing rods for a screen 21 which may be of any suitable or desired mesh, fine enough to exclude small fish. This screen 21 is secured to the chains and rods 20 by any suitable means and is made of a width sufficient to span the width of the ditch in which the excluder is to be used so that when installed it will operate to prevent the passage at the sides thereof of fish or small animals.

A shield 22 is arranged in advance of the screen 21 and rests on the bottom of the ditch as is shown clearly in Fig. 2, being curved upwardly and contacting with the front stretch of the screen, it being obvious that said screen is made in the form of an endless band or strip. The shield 22 has upstanding curved sides 23, the inner ends of which converge toward each other as shown in Fig. 1 and these sides extend to the top of the ditch and operate to prevent all possibility of fish passing between the ends of the screen and the sides of the ditch.

A transversely curved shield 24 is mounted in the bottom of the ditch as shown in Fig. 4 and is designed to receive the sprocket gears 17 around which the screen 21 passes so that all possibility of fish passing below the screen is avoided.

The rod 8 which is the driving shaft for the screen is preferably made in telescoping sections to provide for its adjustability so that the water wheel 2 and the screen 21 may be positioned at varying distances if found desirable.

It will thus be seen that the screen 21 which is disposed in advance of its driving wheel 2 will be rotated very rapidly and will operate to turn back any fish entering the ditch above it and yet permit the water to pass freely therethrough.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

In a fish excluder for waterways, a screen to be positioned across the waterway, and a shield for resting on the bottom of the waterway in which the excluder is to be located and arranged in advance of the screen adjacent thereto, said shield being curved upwardly and contacting at its free edge with the front stretch of the screen and having upstanding laterally curved sides, the inner ends of which curve toward each other and project inwardly beyond the ends of the screen and contact with the screen, said sides extending to the top of the ditch in connection with which the excluder is to be used.

In testimony whereof I affix my signature in presence of two witnesses.

HENRY O. PETERSON.

Witnesses:
  JOHN E. ODEGARD,
  A. C. ANDERSEN.

Copies of this patent may be obtained for five cents each, by addressing the "Commissioner of Patents, Washington, D. C."